US008412426B2

(12) United States Patent
Sah (10) Patent No.: US 8,412,426 B2
(45) Date of Patent: Apr. 2, 2013

(54) MULTI-MODE HYBRID TRANSMISSION AND METHOD FOR PERFORMING A QUASI-ASYNCHRONOUS SHIFT IN A HYBRID TRANSMISSION

(75) Inventor: Jy-Jen F. Sah, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1062 days.

(21) Appl. No.: 12/399,503

(22) Filed: Mar. 6, 2009

(65) Prior Publication Data

US 2010/0228412 A1    Sep. 9, 2010

(51) Int. Cl.
  *G06F 7/00*    (2006.01)
  *G06F 17/00*    (2006.01)
  *G06F 19/00*    (2011.01)

(52) U.S. Cl. .......... 701/64; 701/51; 701/61; 701/67; 180/65.21; 180/65.275; 180/65.6; 180/65.7

(58) Field of Classification Search ............ 701/22, 701/51, 52, 53, 55, 61, 64, 66, 67; 180/65.1, 180/65.21, 65.265, 65.275, 65.6, 65.7; 477/7, 477/8, 14, 151, 16, 17
See application file for complete search history.

(56) References Cited

U.S. PATENT DOCUMENTS

| 5,211,079 A | 5/1993 | Runde et al. |
| 5,282,401 A | 2/1994 | Hebbale et al. |
| 7,010,406 B2 | 3/2006 | Sah et al. |
| 7,130,734 B2 | 10/2006 | Sah et al. |
| 7,217,211 B2 | 5/2007 | Klemen et al. |
| 7,324,885 B2 | 1/2008 | Sah et al. |
| 7,356,398 B2 | 4/2008 | Steinmetz et al. |
| 7,549,944 B2 * | 6/2009 | Tabata et al. ............. 477/5 |
| 8,214,116 B2 * | 7/2012 | Whitton ............. 701/55 |
| 8,303,467 B2 * | 11/2012 | Iwase et al. ............. 477/98 |
| 2007/0260381 A1 | 11/2007 | Sah |
| 2007/0276569 A1 | 11/2007 | Sah et al. |

* cited by examiner

*Primary Examiner* — Hussein Elchanti
*Assistant Examiner* — Rami Khatib
(74) *Attorney, Agent, or Firm* — Quinn Law Group, PLLC (57) ABSTRACT

Improved methods for executing a clutch-to-clutch quasi-asynchronous shift in a hybrid transmission, and a hybrid transmission using the same, are presented herein. The method includes: pre-filling the on-coming clutch; determining if the shift is completed using the on-coming or off-going clutch; slipping the off-going clutch first if the shift operation uses the off-going clutch; determining on-coming clutch slip speed and acceleration profiles; determining if the on-coming clutch is filled and whether the slip sign is correct; if using the off-going clutch, locking the on-coming clutch and exhausting the off-going clutch if the on-coming clutch is filled and the slip sign is correct; if using the on-coming clutch, determining whether the on-coming clutch slip is less than a slip threshold and exhausting the off-going clutch if the on-coming clutch is filled and the slip sign is correct; and locking the on-coming clutch if the slip is less than the slip threshold.

19 Claims, 4 Drawing Sheets

FIG. 1

| Transmission State | C4 | C3 | C2 | C1 |
|---|---|---|---|---|
| Neutral 1 | Off | Off | Off | Off |
| ETC 1 | Off | Off | Off | ON |
| ETC 2 | Off | Off | ON | Off |
| ETC 12 | Off | Off | ON | ON |
| Neutral 2 | Off | ON | Off | Off |
| EVT 1 | Off | ON | Off | ON |
| EVT 4 | Off | ON | ON | Off |
| Park | Off | ON | ON | ON |
| Neutral 3 | ON | Off | Off | Off |
| EVT 2 | ON | Off | Off | ON |
| EVT 3 | ON | Off | ON | Off |
| FG 2 | ON | Off | ON | ON |
| Neutral 4 | ON | ON | Off | Off |
| FG 1 | ON | ON | Off | ON |
| FG 3 | ON | ON | ON | Off |

MULTI-MODE HYBRID TRANSMISSION AND METHOD FOR PERFORMING A QUASI-ASYNCHRONOUS SHIFT IN A HYBRID TRANSMISSION

TECHNICAL FIELD

The present invention relates generally to hybrid powertrains for motorized vehicles. More specifically, this invention relates to shift control methods for regulating operation of a multi-mode hybrid transmission, and hybrid transmissions using the same.

BACKGROUND OF THE INVENTION

Most conventional motorized vehicles, such as the modern-day automobile, include a powertrain that operates to propel the vehicle and power the onboard vehicle electronics. The powertrain, which is sometimes referred to as a "drivetrain", is generally comprised of an engine that delivers driving power to the vehicle's final drive system (e.g., rear differential, axle, and wheels) through a multi-speed power transmission. Automobiles have traditionally been powered solely by a reciprocating-piston type internal combustion engine (ICE) because of its ready availability and relatively inexpensive cost, light weight, and overall efficiency. Such engines include 4-stroke compression-ignited diesel engines and 4-stroke spark-ignited gasoline engines.

Hybrid vehicles, on the other hand, utilize alternative power sources to propel the vehicle, minimizing reliance on the engine for power, increasing overall vehicle fuel economy. A hybrid electric vehicle (HEV), for example, incorporates both electric energy and chemical energy, and converts the same into mechanical power to propel the vehicle and power the vehicle systems. The HEV generally employs one or more electric machines that operate individually or in concert with an internal combustion engine to propel the vehicle. Since hybrid vehicles can derive their power from sources other than the engine, engines in hybrid vehicles can be turned off while the vehicle is propelled by the alternative power source(s).

Series hybrid architectures, sometimes referred to as Range-Extended Electric Vehicles (REEVs), are generally characterized by an internal combustion engine in driving communication with an electric generator. The electric generator, in turn, provides power to one or more electric motors that operate to rotate the final drive members. In effect, there is no direct mechanical connection between the engine and the final drive members in a series hybrid powertrain. The lack of a mechanical link between the engine and wheels allows the engine to be run at a constant and efficient rate—e.g., closer to the theoretical limit of 37%, rather than the normal average of 20%, even as vehicle speed changes. The electric generator may also operate in a motoring mode to provide a starting function to the internal combustion engine. This system may also allow the electric motor(s) to recover energy from slowing the vehicle and storing it in the battery through "regenerative braking".

Parallel hybrid architectures are generally characterized by an internal combustion engine and one or more electric motor/generator assemblies, each of which has a direct mechanical coupling to the power transmission. Most parallel hybrid designs combine a large electric generator and a motor into one unit, providing tractive power and replacing both the conventional starter motor and the alternator. One such parallel hybrid powertrain architecture comprises a two-mode, compound-split, electro-mechanical transmission which utilizes an input member for receiving power from the ICE, and an output member for delivering power from the transmission to the driveshaft. First and second motor/generators operate individually or in concert to rotate the transmission output shaft. The motor/generators are electrically connected to an energy storage device for interchanging electrical power between the storage device and the first and second motor/generators. A control unit is employed for regulating the electrical power interchange between the energy storage device and motor/generators, as well as the electrical power interchange between the first and second motor/generators.

Electrically variable transmissions (EVT) provide for continuously variable speed ratios by combining features from both series and parallel hybrid powertrain architectures. EVTs are operable with a direct mechanical path between the internal combustion engine and final drive, thus enabling relatively high transmission efficiency and the application of lower cost, less massive motor hardware. EVTs are also operable with engine operation that is mechanically independent from the final drive, in various mechanical/electrical split contributions, thereby enabling high-torque continuously-variable speed ratios, electrically dominated launches, regenerative braking, engine-off idling, and two-mode operation.

An EVT can use what is commonly known as "differential gearing" to achieve continuously variable torque and speed ratios between input and output without sending all power through the variable elements. The EVT can utilize the differential gearing to send a fraction of its transmitted power through the electric motor/generator(s). The remainder of its power is sent through another, parallel path that is mechanical and direct (i.e., "fixed ratio"), or alternatively selectable. One form of differential gearing is the epicyclic planetary gear arrangement. Planetary gearing offers the advantage of compactness and different torque and speed ratios among all members of the planetary gearing subset. However, it is possible to design a power split transmission without planetary gears, for example, as by using bevel gears or other differential gearing.

Traditionally, a number of hydraulically actuated torque establishing devices, such as clutches and brakes (the term "clutch" used hereinafter to refer to both clutches and brakes), are selectively engageable to activate the aforementioned gear elements for establishing desired forward and reverse speed ratios between the transmission's input and output shafts. The speed ratio is generally defined as the transmission input speed divided by the transmission output speed. Thus, a low gear range has a high speed ratio, whereas a high gear range has a lower speed ratio.

Shifting from one speed ratio to another is generally performed in response to engine throttle and vehicle speed, and normally involves releasing one or more "off-going" clutches associated with the current or attained speed ratio, and applying one or more "on-coming" clutches associated with the desired or commanded speed ratio. Shifts performed in the above manner are termed "clutch-to-clutch" shifts, and require precise timing in order to achieve optimal quality shifting, and tend to reduce a perceptible delay in the shift event. A shift made from a high speed ratio to a lower speed ratio is referred to commonly and herein as an "upshift", whereas a shift made from a low speed ratio to a higher speed ratio is referred to commonly and herein as a "downshift". Shift control includes "power on" shifting and "power off" shifting. Power on shifting refers to a shift operation which takes place during driver "tip-in"—i.e., when the driver depresses the accelerator pedal, while power off shifting refers to a shift operation which takes place during driver "tip-out"—i.e., when the accelerator pedal is partially or fully released.

The process of shifting from one gear to another gear occurs in three distinguishable phases: (a) fill phase; (b) torque phase; and (c) inertia phase. In the fill phase, the on-coming clutch element is prepared for torque transmission, during which the apply chamber of the on-coming clutch is filled with fluid. During the torque phase in power-on upshifts, the drivetrain torque is progressively transmitted from the off-going clutch to the on-coming clutch. In the torque phase, the on-coming pressure is progressively increased to increase the on-coming clutch torque capacity while the off-going pressure is progressively released to reduce the off-going clutch torque capacity. Thereafter, the gear shifting process enters into the inertia phase, where the slip speed of the on-coming clutch progresses to zero. When the drivetrain speed reaches its target speed, the output torque drops to the post-shift level, completing the shift.

In general, ratio changes in a transmission should be performed such that torque disturbances are minimized, and the shifts are "smooth" and "unobjectionable". Additionally, release and application of clutches should be performed in a manner which consumes the least amount of energy, and does not negatively impact durability of the clutches. A major factor affecting these considerations is the torque at the clutch being controlled, which may vary significantly in accordance with such performance demands as acceleration and vehicle loading. In certain EVTs, shift torque reductions can be accomplished by a zero, or close to zero, torque condition at the clutches at the time of application or release, which condition follows substantially zero slip across the clutch.

Conventional EVTs are designed to operate in both fixed gear (FG) modes and electrically variable (EVT) modes through the controlled activation of the torque-transfer clutches described above, typically employing a hydraulic control circuit to regulate clutch actuation. When operating in a fixed gear mode, the rotational speed of the transmission output member is a fixed ratio of rotational speed of the input member from the engine, depending upon the selected arrangement of the aforementioned differential gearing subsets. When operating in an EVT mode, the rotational speed of the transmission output member is variable, based upon operating speeds of the aforementioned electrical motor/generators, which can be connected to the transmission output via actuation of a clutch, or by direct connection.

In conventional transmission operation, in which clutch-to-clutch shift methods are employed, upshifts and downshifts are typically performed during "synchronous" operation of the transmission wherein oncoming and off-going clutches are applied and released at zero slip speed and zero slip speed acceleration. The oncoming clutch is applied while controlling slip speed thereacross to substantially zero. Thereafter, the off-going clutch is released while controlling slip speed thereacross to substantially zero. However, use of the on-coming or off-going clutch to perform an upshift or downshift depends on whether the transmission output torque is positive or negative. For example, an upshift with positive output torque can only be performed with the on-coming clutch for the target gear. Using the off-going clutch may result in engine flare and torque reversal.

SUMMARY OF THE INVENTION

According to one embodiment of the present invention, a method for executing a clutch-to-clutch shift operation in a hybrid transmission is presented. The initial operating mode, which may be an electrically variable transmission (EVT) mode, is characterized by an off-going clutch, whereas the target operating mode, which may also be an EVT mode, is characterized by an on-coming clutch. The method comprises: commanding fluid be distributed to the on-coming clutch (e.g., pre-filling the on-coming clutch); determining if the shift operation is completed using the on-coming clutch or the off-going clutch; if the shift operation is completed using the on-coming clutch, then determining if an over/under ratio is needed; determining on-coming clutch slip speed and acceleration profiles; determining if the on-coming clutch slip sign is correct; determining if the on-coming clutch is filled; if the on-coming clutch is filled and the slip sign is correct, calculating and applying the off-going clutch torque and then exhausting the off-going clutch; determining if the on-coming clutch slip is less than a predetermined slip threshold; and, if the on-coming clutch slip is less than the slip threshold, locking the on-coming clutch.

The shift operation may be characterized as a quasi-asynchronous shift, wherein the slip speed across the on-coming and off-going clutches is non-zero throughout substantially the entire shift operation. Ideally, the slip speed across the on-coming and off-going clutches is controlled by adjusting input torque from either the engine or a motor, each of which is drivingly connected to the transmission.

According to one aspect of this particular embodiment, the over/under ratio is needed, for example, if the shift operation is either a power-on downshift or a power-off upshift that uses the on-coming clutch. To this regard, if it is established that the over/under ratio is needed, the on-coming clutch slip speed and acceleration profiles are determined based, in part, on the over/under ratio. For instance, the on-coming clutch slip speed profile first targets a slip speed equivalent of the over/under ratio speed, and thereafter retargets to zero to engage the on-coming clutch when clutch torque is to be exchanged between the on-coming and off-going clutch. However, if the over/under ratio is not needed, the on-coming clutch slip and acceleration profiles are determined without the over/under ratio.

In accordance with another aspect, the on-coming clutch slip sign is deemed correct if the sign of the output torque command is the same as the on-coming clutch slip sign. Clutch torque and clutch slip always have the same sign (i.e., either both positive or both negative), and the transfer function between clutch torque and output torque has a fixed relationship. So, if output torque command is positive, and the transfer function has a positive coefficient, a positive clutch torque will produce positive output torque.

As part of another aspect of this embodiment, the method includes determining input speed and acceleration profiles, preferably before pre-filling the on-coming clutch or determining whether the on-coming clutch is used to complete the shift operation. The input speed and acceleration profiles are generally based on profile calibrations (e.g., the proportion of each segment), as well as the initial and target speeds of the on-coming clutch. The input speed and acceleration profiles may include a time-based change in speed of the on-coming clutch comprising a three-segment profile. The first segment comprises a ramp up in speed of the oncoming clutch, whereas the second segment comprises a steady state change in speed of the oncoming clutch, and the third segment comprises a ramp down in speed of the oncoming clutch.

In accordance with yet another facet of this embodiment, the method also includes controlling the transmission input speed and the on-coming clutch speed by adjusting torque input from the engine, the motor/generator(s), or both. Ideally, if the shift operation is completed using the off-going clutch, the transmission input speed and on-coming clutch speed are modified prior to exhausting the off-going clutch. In contrast, the transmission input speed and on-coming clutch speed are modified after exhausting the off-going clutch if the shift operation is completed using the on-coming clutch.

In another facet of this embodiment, the shift operation does not use the on-coming clutch, but is rather completed using the off-going clutch. In this instance, the method further comprises: controllably slipping the off-going clutch prior to slipping the on-coming clutch; determining the on-coming clutch slip speed and acceleration profiles based, at least in part, upon the over/under ratio; determining if the on-coming clutch is filled and the clutch slip sign is correct; and, if so, locking the on-coming clutch and exhausting the off-going clutch. In this instance, the input speed of the transmission and the on-coming clutch speed are controlled before applying the off-going clutch torque and exhausting the off-going clutch. Slipping the off-going clutch may be accomplished by controlling the current torque capacity of the off-going clutch to below reactive torque.

According to another embodiment of the present invention, a multi-mode, electrically variable, hybrid transmission, is presented. The hybrid transmission includes two motor/generators assemblies and three differential gear sets. Each differential gear set has first, second and third gear members (e.g., a sun gear, a ring gear, and an array of planetary gears, in any order). The first motor/generator is continuously connected to one of the differential gear sets, and controllable to provide power thereto. The second motor/generator is continuously connected to a different differential gear set, and controllable to provide power thereto.

The transmission also includes input and output members, and a plurality of torque-transmitting devices. The input member is drivingly connected to an engine, and continuously connected to one of the aforementioned differential gear sets. The output member, on the other hand, is continuously connected to another of the differential gear sets, and preferably configured to transmit power to a final drive system.

The plurality of torque-transmitting devices includes a number of torque transmitting devices, such as clutches. The torque-transmitting devices are selectively operable to provide various operating states in the multi-mode hybrid transmission. In this embodiment, engagement of a first (off-going) clutch simultaneous with disengagement of a second (on-coming) clutch establishes an initial operating mode. Likewise, disengagement of the off-going clutch simultaneous with engagement of the on-coming clutch establishes a target operating mode. Transitioning the off-going and on-coming clutches from the initial operating mode to the target operating mode includes a fill phase, a torque phase, and an inertia phase.

A controller is in operative communication with the various torque-transmitting devices, and configured to control operation of the same. The controller has a storage medium and a programmable memory. The controller is programmed and configured to determine if a quasi-asynchronous shift is commanded, and respond to such a command by determining if the shift operation is completed using the on-coming clutch or the off-going clutch. If the quasi-asynchronous shift operation is completed using the on-coming clutch, the controller will command the torque phase of shift sequence precede the inertia phase. In contrast, if the shift operation is completed using the off-going clutch, the controller will command the inertia phase precede the torque phase.

The above features and advantages, and other features and advantages of the present invention will be readily apparent from the following detailed description of the preferred embodiments and best modes for carrying out the present invention when taken in connection with the accompanying drawings and appended claims.

DESCRIPTION OF THE PREFERRED EMBODIMENT

The present invention is described herein in the context of a hybrid-type vehicular powertrain having a multi-mode, multi-speed, electrically variable, hybrid transmission, which is intended solely to offer a representative application by which the present invention may be incorporated and practiced. Accordingly, the present invention is by no means limited to the particular powertrain arrangement shown in the drawings. Furthermore, the hybrid powertrain illustrated herein has been greatly simplified, it being understood that further information regarding the standard operation of a hybrid powertrain, or a hybrid-type vehicle for that matter, may be found in the prior art.

Figure 1:
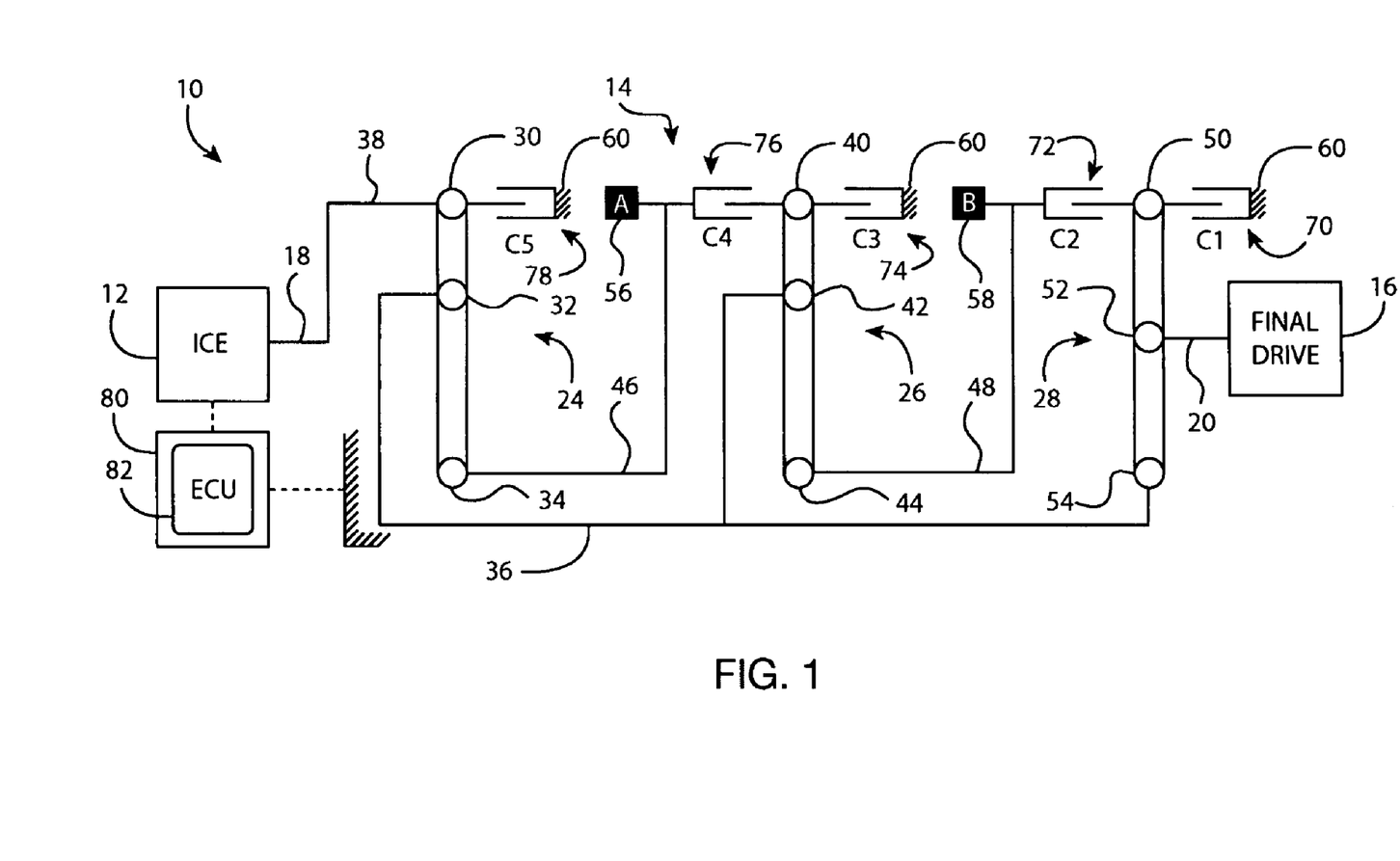
FIG. 1 is a schematic illustration of an exemplary vehicle powertrain with a multi-mode, electrically variable hybrid transmission in accordance with the present invention.

Referring to the drawings, wherein like reference numbers refer to like components throughout the several views, there is shown in FIG. 1 a schematic depiction of an exemplary vehicle powertrain system, designated generally as 10. The powertrain 10 comprises a restartable engine 12 that is drivingly connected to, or in power flow communication with, a final drive system 16 via a multi-mode, electrically variable, hybrid-type power transmission 14. The transmission 14 is designed to receive at least a portion of its driving power from the engine 12, for example, through an input member 18. The transmission input member 18, which is preferably in the nature of a shaft, may be the engine output shaft (most commonly referred to as a "crankshaft"). Alternatively, a transient torque damper or hydrodynamic torque converter (not shown) may be implemented between the engine 12 and the input member 18 of the transmission 14. The engine 12 transfers power, preferably by way of torque, to the transmission 14, which, in turn, distributes torque through a transmission output member or shaft 20 to drive the final drive system 16, and thereby propel the vehicle (not specifically identified herein).

In the embodiment depicted in FIG. 1, the engine 12 may be any of numerous forms of petroleum-fueled prime movers, such as a reciprocating-piston type internal combustion engine, which may include spark-ignited gasoline engines and compression-ignited diesel engines. The engine 12 is readily adaptable to provide its available power to the transmission 14 at a range of operating speeds, for example, from idle, at or near 600 revolutions per minute (RPM), to over 6,000 RPM. Irrespective of the means by which the engine 12 is connected to the transmission 14, the input member 18 is connected to a differential gear set encased within the transmission 14, as explained in extensive detail hereinbelow.

Referring still to FIG. 1, the hybrid transmission 14 utilizes one or more differential gear arrangements, preferably in the nature of three interconnected epicyclic planetary gear sets, designated generally at 24, 26 and 28, respectively. Each gear set includes three gear members: a first, second and third member. In referring to the first, second and third gear sets in this description and in the claims, these sets may be counted "first" to "third" in any order in the drawings (e.g., left to right, right to left, etc.). Likewise, in referring to the first, second and third members of each gear set in this description and in the claims, these members may be counted "first" to "third" in any order in the drawings (e.g., top to bottom, bottom to top, etc.) for each gear set.

The first planetary gear set 24 has three gear members: a first, second and third member 30, 32 and 34, respectively. In a preferred embodiment, the first member 30 consists of an outer gear member (typically designated as a "ring gear") that circumscribes the third member 34, which may consist of an inner gear member (commonly designated as a "sun gear"). In this instance, the second member 32 acts as a planet carrier member. That is, a plurality of planetary gear members (also referred to in the art as "pinion gears") is rotatably mounted on the second member/planet carrier 32. Each planetary gear member is meshingly engaged with both the first member/ring gear 30 and the third member/sun gear 34.

The second planetary gear set 26 also has three gear members: a first, second and third member 40, 42 and 44, respectively. In accordance with the preferred embodiment discussed above with respect to the first planetary gear set 24, the first member 40 of the second planetary gear set 26 is an outer "ring" gear member that circumscribes the third member 44, which is an inner "sun" gear member. The ring gear member 40 is coaxially aligned and rotatable with respect to the sun gear member 44. A plurality of planetary gear members are rotatably mounted on the second member 42, which acts as a planet carrier member, such that each planetary gear meshingly engages both the ring gear member 40 and the sun gear member 44.

The third planetary gear set 28, similar to the first and second gear sets 24, 26, also has first, second and third members 50, 52 and 54, respectively. In this arrangement, however, the second member 52 is preferably the outer "ring" gear, which circumscribes the third member or inner "sun" gear 54. The ring gear member 52 is coaxially aligned and rotatable with respect to the sun gear member 54. The first member 50 is the planet carrier in this particular gear set. As such, a plurality of planetary or pinion gear members are rotatably mounted on the carrier member 50, each aligned to meshingly engage both the ring gear member 52 and the sun gear member 54.

In a preferred embodiment, the first and second planetary gear sets 24, 26 each comprise simple planetary gear sets, whereas the third planetary gear set comprises a compound planetary gear set. However, each of the carrier members described above can be either a single-pinion (simple) carrier assembly or a double-pinion (compound) carrier assembly. Embodiments with long pinions are also possible.

The first, second and third planetary gear sets 24, 26, 28 are compounded in that the second member 32 of the first planetary gear set 24 is conjoined with (i.e., continuously connected to) the second member 42 of the second planetary gear set 26 and the third member 54 of the third planetary gear set 28, as by a central shaft 36. As such, these three gear members 32, 42, 54 are rigidly attached for common rotation.

The engine 12 is continuously connected to the first planetary gear set 24, namely first member 30, for example, through an integral hub plate 38, for common rotation therewith. The third member 34 of the first planetary gear set 24 is continuously connected, for example, by a first sleeve shaft 46, to a first motor/generator assembly 56, which is also referred to herein as "Motor A". The third member 44 of the second planetary gear set 26 is continuously connected, for example, by a second sleeve shaft 48, to a second motor/generator assembly 58, also referred to herein as "Motor B". The second member 52 of the third planetary gear set 28 is continuously connected to transmission output member 20, for example, through an integral hub plate. The first and second sleeve shafts 46, 48 may circumscribe the central shaft 36.

A first torque transfer device 70 (or clutch "C1") selectively connects the first gear member 50 with a stationary member, represented in FIG. 1 by transmission housing 60. The second sleeve shaft 48, and thus gear member 44 and motor/generator 58, is selectively connectable to the first member 50 of the third planetary gear set 28 through the selective engagement of a second torque transfer device 72 (or clutch "C2"). A third torque transfer device 74 (or clutch "C3") selectively connects the first gear member 40 of the second planetary gear set 26 to the transmission housing 60. The first sleeve shaft 46, and thus third gear member 34 and first motor/generator 56, is also selectively connectable to the first member 40 of the second planetary gear set 26, through the selective engagement of a fourth torque transfer device 76 (or clutch "C4"). An optional fifth torque transfer device 78 (or clutch "C5") selectively connects the engine 12 and the first gear member 40 of the second planetary gear set 26 to the transmission housing 60. The first and second torque transfer devices 70, 72 may be referred to as "output clutches", whereas the third and fourth torque transfer devices 74, 76 may be referred to as "holding clutches". The use of such terminology as "first clutch", "second clutch", "third clutch", etc. in the claims is not intended to limit such claims to C1, C2 and C3, respectively, but may indicate any of the aforementioned torque transfer devices.

In the exemplary embodiment depicted in FIG. 1, the various torque transfer devices 70, 72, 74, 76, 78 are all friction clutches. However, it is also contemplated that other conventional clutch configurations be employed, such as dog clutches, rocker clutches, etc. Each clutch is preferably hydraulically actuated, receiving pressurized hydraulic fluid from a pump (not shown). Hydraulic actuation of clutches C1-C5 is accomplished, for example, by using a conventional hydraulic fluid control circuit. Since the control circuit, per se, is not the subject of this invention, it will not be described in detail herein, it being understood that further information regarding the standard operation of a hydraulic fluid control circuit may be found in the prior art.

In the exemplary embodiment described herein, wherein the hybrid powertrain 10 is used as a land vehicle, the transmission output shaft 20 is operatively connected to the final drive system (or "driveline"), which may comprise a front or rear differential, or other torque transfer device, which provides torque output to one or more wheels through respective vehicular axles or half-shafts (none of which are explicitly illustrated). The wheels may be either front or rear wheels of the vehicle on which they are employed, or they may be a drive gear of a track vehicle. Although not specifically illustrated in FIG. 1, it should be appreciated that the final drive system may comprise any known configuration, including front wheel drive (FWD), rear wheel drive (RWD), four-wheel drive (4WD), or all-wheel drive (AWD), within the scope of the present invention.

All of the planetary gear sets 24, 26, 28, as well as the first and second motor/generators 56, 58, are preferably coaxially oriented, as about the axially disposed intermediate central shaft 36. The motor/generators 56, 58 may take on an annular configuration, which permits them to generally circumscribe the three planetary gear sets 24, 26, 28. This configuration assures that the overall envelope, i.e., the diametrical and longitudinal dimensions, of the hybrid transmission 14 are minimized.

The hybrid transmission 14 receives input motive torque from a plurality of "torque-generative devices", which include the engine 12 and motors/generators 56, 58, as a result of energy conversion from fuel stored in a fuel tank or electrical potential stored in an electrical energy storage device (neither of which is explicitly illustrated). That is, the engine 12, Motor A, and Motor B operate individually or in concert, in conjunction with the planetary gear sets and selectively engageable torque transmitting mechanisms highlighted above, to rotate the transmission output shaft 20. Moreover, the motor/generator assemblies A, B are preferably configured to selectively operate as both a motor and a generator. For instance, the motor/generator assemblies A, B are capable of converting electrical energy to mechanical energy (e.g., during vehicle propulsion), and converting mechanical energy to electrical energy (e.g., during regenerative braking).

With continuing reference to FIG. 1, an electronic control apparatus (or "controller"), comprising a distributed controller architecture, is shown schematically in an exemplary embodiment as a micro-processor based electronic control unit (ECU) 80. The ECU 80 has a storage medium with a suitable amount of programmable memory, collectively represented at 82, that is programmed to include, among other things, an algorithm or method 100 of regulating operation of a multi-mode hybrid transmission, as will be discussed in further detail below with respect to FIG. 6. The control apparatus of FIG. 1 is operable, as described hereinafter, to provide coordinated system control of the powertrain system depicted and described herein. The constituent elements of the control apparatus comprise a subset of an overall vehicle control system. The control system is operable to synthesize pertinent information and inputs, and execute control methods and algorithms to control various actuators to achieve control targets, including such parameters as fuel economy, emissions, performance, driveability, and protection of drivetrain hardware, such as, but certainly not limited to, the engine 12, transmission 14, first and second motor/generators 56, 58, and final drive 16.

The distributed controller architecture—i.e., ECU 80, may comprise a Transmission Control Module (TCM), an Engine Control Module (ECM), a Transmission Power Inverter Module (TPIM), a Battery Pack Control Module (BPCM), or any combination thereof. A hybrid control module (HCP) may be integrated to offer overall control and coordination of the aforementioned controllers. A User Interface (UI) is operatively connected to a plurality of devices (not individually shown) through which a vehicle operator typically controls or directs operation of the powertrain. Exemplary vehicle operator inputs to the UI include an accelerator pedal, a brake pedal, transmission gear selector, and vehicle speed cruise control. Each of the aforementioned controllers communicates with other controllers, sensors, actuators, etc., for example, via a local area network (LAN) bus. The LAN bus allows for structured communication of control parameters and commands between the various controllers. The specific communication protocol utilized is application-specific. By way of example, and certainly not limitation, one communication protocol is the Society of Automotive Engineers standard J1839. The LAN bus and appropriate protocols provide for robust messaging and multi-controller interfacing between the aforementioned controllers, and other controllers providing functionality such as antilock brakes, traction control, and vehicle stability.

The ECM is operatively connected to the engine 12. The ECM is configured to acquire data from a variety of sensors and control a variety of actuators, respectively, of the engine 12 over a plurality of discrete lines. The ECM receives an engine torque command from the HCP, generates a desired axle torque, and an indication of actual engine torque, which is communicated to the HCP. Various other parameters that may be sensed by the ECM include engine coolant temperature, engine input speed to the transmission, manifold pressure, and ambient air temperature and pressure. Various actuators that may be controlled by the ECM include, for example, fuel injectors, ignition modules, and throttle control modules.

The TCM is operatively connected to the transmission 14, and functions to acquire data from a variety of sensors and provide command signals to the transmission 14. Inputs from the TCM to the HCP may include estimated clutch torques for each of the clutches C1-C5, and rotational speed of the transmission output shaft 20. Additional actuators and sensors may be used to provide additional information from the TCM to the HCP for control purposes.

Each of the aforementioned controllers is preferably a general-purpose digital computer, generally comprising a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the respective functions of each computer. Information transfer between the various computers is preferably accomplished using the aforementioned LAN.

In response to operator input, as captured by the UI, the supervisory HCP controller and one or more of the other controllers described above with respect to FIG. 1 determine required transmission output torque. Selectively operated components of the hybrid transmission 14 are appropriately controlled and manipulated to respond to the operator demand. For example, in the exemplary embodiment shown in FIG. 1, when the operator has selected a forward drive range and manipulates either the accelerator pedal or the brake pedal, the HCP determines an output torque for the transmission, which affects how and when the vehicle accelerates or decelerates. Final vehicle acceleration is affected by other variables, including such factors as road load, road grade, and vehicle mass. The HCP monitors the parametric states of the torque-generative devices, and determines the output of the transmission required to arrive at the desired torque output. Under the direction of the HCP, the transmission 14 operates over a range of output speeds from slow to fast in order to meet the operator demand.

The ECU 80 also receives frequency signals from sensors for processing into input member 18 speed, Ni, and output member 20 speed, No, for use in the control of transmission 14. The system controller may also receive and process pressure signals from pressure switches (not separately illustrated) for monitoring clutch application chamber pressures. Alternatively, pressure transducers for wide range pressure monitoring may be employed. PWM and/or binary control signals are transmitted by the controller 80 to transmission 14 for controlling fill and drain of clutches C1-C5 for application and release thereof. Additionally, the controller 80 may receive transmission fluid sump temperature data, such as from conventional thermocouple input (not shown), to derive a sump temperature, and provide PWM signal which may be derived from input speed Ni and sump temperature for control of line pressure via an appropriate regulator.

Fill and drain of clutches C1-C5 are effectuated, for example, by way of solenoid controlled spool valves responsive to PWM and binary control signals as alluded to above. Trim valves are preferably employed using variable bleed solenoids to provide precise placement of the spool within the valve body and correspondingly precise control of clutch pressure during apply. Similarly, a line pressure regulator (not shown) may be of a solenoid controlled variety for establishing regulated line pressure in accordance with the described PWM signal. Clutch slip speeds across clutches are derived, for example, from transmission output speed, Motor A speed, and Motor B speed.

Figure 2:
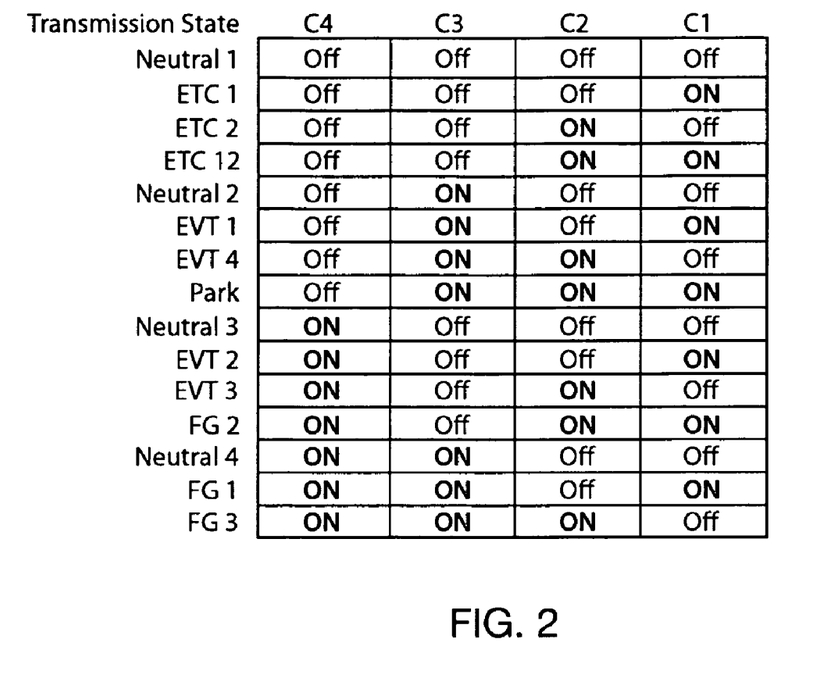
FIG. 2 is a truth table listing the engaged torque-transmitting mechanisms for each of the operating modes of the transmission illustrated in FIG. 1.

The multi-mode, electrically variable, hybrid transmission operates in several transmission operating modes. The truth table provided in FIG. 2 presents the engagement schedule of the torque-transmitting mechanisms C1-C5 to achieve the array of operating state or modes. Put another way, the various transmission operating modes described in the table indicate which of the specific clutches C1-C5 are engaged or actuated, and which are released or deactivated for each of the operating modes.

There are four neutral modes presented in FIG. 2. In Neutral 1, all clutches are released. Neutral 1 may be when the entire vehicle is stopped an in an off-state, and thus there is no power distribution—electrical, mechanical, or otherwise, being actively distributed throughout the powertrain 10. In this instance, a standard 12-volt starting-lighting-and-ignition (SLI) battery may be used for engine start. In Neutral 2, only clutch C3 is engaged, and Motor A and Motor B react engine for start or charge. Similar to Neutral 2, when the transmission 14 is in Neutral 3, Motor A and Motor B react engine for start or charge with clutch C4 as the only engaged torque transmitting device. In Neutral 4, the third and fourth clutches C3, C4 are both in an activated or applied state. In this instance, Motor A is locked or "grounded", and Motor B is geared with the engine 12 for engine start.

The transmission 14 may also operate in one or more modes with three speed degrees of freedom (abbreviated hereinafter for simplicity as "DOF"). These modes may or may not include reaction torque sources such that the transmission is capable of producing output torque proportional to engine torque or motor torque. If a mode with three speed DOF is capable of producing output torque, the torques of the engine and any motor connected as a reaction to the engine torque will generally be proportional to the output torque. If a motor is not connected as a reaction to the engine torque, its torque can be commanded to control its speed independently of the transmission input and output speed.

In a mode with three speed DOF, it is generally not possible to easily control battery power independently of output torque. This type of mode produces an output torque which is proportional to each of the reacting torque sources in the system. The fraction of total output power provided by each of the three torque sources may be adjusted by varying the speeds of the motors and input. These modes are hereafter referred to as electric torque converter (ETC) modes in recognition of the fact that power flows to or from the ESD is a function of the output torque and the speed of the engine, output, and one of the motors. Mathematically, the speed and torque equations of this class of modes take the form:

$$\begin{bmatrix} T_a \\ T_b \\ T_i \end{bmatrix} = [a_{1,1} \ a_{1,2} \ a_{1,3}][T_o]$$

and $$[N_b] = [b_{1,1} \ b_{1,2} \ b_{1,3}] \begin{bmatrix} N_a \\ N_i \\ N_o \end{bmatrix}$$

where a and b are coefficients determined by the transmission gearing.

If $a_{11}$ is nonzero, motor A serves as a reaction member and its torque is proportional to output torque when operating in the ETC mode. If $a_{11}$ is zero, motor A is disconnected and its torque is not determined by the output torque. If $a_{12}$ is nonzero, motor B serves as a reaction member and its torque is proportional to output torque when operating in the ETC mode. If $a_{12}$ is zero, motor B is disconnected and its torque is not determined by the output torque. If $a_{13}$ is nonzero, the engine can contribute to output torque during operation in the fixed gear mode. If $a_{13}$ is zero, the input is disconnected and its torque is not determined by the output torque. If all of $a_{11}$, $a_{12}$, and $a_{13}$ are zero, the mode is a neutral mode that is not capable of producing output torque.

In the embodiment presented herein, the first and second planetary gear sets 24, 26 cooperate with the first and second motor/generators 56, 58, along with the selective engagement of the first and second clutches C1, C2, to constitute an electric torque converter (ETC). By way of example, and not limitation, when the transmission 14 is operating in an "ETC mode", the electric output of Motor A and/or Motor B, depending upon the active control schedule, can be adapted to control the transfer of torque from the engine 12 through the transmission differential gearing to the output member 20. When the vehicle is started, ETC1 Mode is established by engaging the first clutch C1. In ETC1 Mode, Motor A reacts the engine 12 with the first and third planetary gear sets 24, 28, and Motor B freewheels. In this ETC mode, the stationary vehicle can be smoothly started with the engine 12 held at a suitable speed by gradually increasing the amount of electric power generated by Motor A—i.e., the reaction force of the Motor A.

There are two other alternative ETC Modes available utilizing the transmission configuration presented herein. ETC2 Mode, also known as "compound ETC", can be initiated by engaging clutch C2, and disengaging the remaining clutches. In ETC2 Mode, Motor A reacts the engine 12 with the first and third planetary gear sets 24, 26, while Motor B reacts the engine 12 and Motor A to the output member 20. The distribution of engine torque is manipulated through the cooperative management of the amount of electric power output generated by Motor A and Motor B. Alternatively, ETC12 Mode can be initiated by engaging both clutch C1 and clutch C2. Similar to ETC 1 mode, Motor A reacts the engine 12 with the first and third planetary gear sets 24, 28. However, in this instance, Motor B is grounded to the transmission housing 60. In this ETC mode, the vehicle can be smoothly accelerated with the engine 12 held at a suitable speed by gradually increasing the reaction force generated by Motor A.

In another instance, when the engine 12 is in an off-state, the transmission can utilize the ETC mode clutch control schedule to vary the amount of electric energy generated by Motor A so as to gradually increase the drive torque of Motor A and/or Motor B. For example, if the transmission 14 is shifted into ETC1 Mode when the engine 12 is in an off-state, the engine 12 will create a reaction force, by way of input member 18. The motive output of the Motor A can then be controlled, and a continuous and uninterrupted transmission output torque maintained, without having to turn the engine 12 on.

The powertrain 10 also has three fixed gear (FG), or "direct", modes of operation. In all fixed gear modes, the vehicle is driven in the forward direction by operation of the engine 12. In general, FG modes result from closing (i.e., actuating) one additional clutch than the number required to select an electrically variable mode. In FG modes, the speed of the input $N_i$ and each motor Na, Nb are proportional to the speed of the output No. Thus, these modes have only one speed DOF. Mathematically, the speed and torque equations of these class of modes take the form:

$$[T_b] = [a_{1,1}\ a_{1,2}\ a_{1,3}] \begin{bmatrix} T_a \\ T_i \\ T_o \end{bmatrix}$$

and $$\begin{bmatrix} N_a \\ N_b \\ N_i \end{bmatrix} = [b_{1,1}\ b_{1,2}\ b_{1,3}][N_o]$$

where a and b are coefficients determined by the transmission gearing. If $b_{11}$ is nonzero, motor A can contribute to output torque during operation in the fixed gear mode. If $b_{12}$ is nonzero, motor B can contribute to output torque during operation in the fixed gear mode. If $b_{13}$ is nonzero, the engine can contribute to output torque during operation in the fixed gear mode. If $b_{13}$ is zero, the mode is an electric-only fixed gear mode.

The simultaneous engagement of clutches C1, C3 and C4 shifts the transmission 14 into FG1 Mode. In FG1, Motor A is grounded, and the engine drives the first planetary gear set 24 to the third planetary gear set 28 and, thus, the output member 20. FG2 Mode is achieved by the selective engagement of clutches C1, C2 and C4. In FG 2, Motor B is grounded, and the engine 12 drives the first and second planetary gear sets 24, 26 to the third planetary gear set 28 and, thus, the output member 20. Likewise, FG3 Mode is achieved by the concurrent engagement of clutches C2, C3 and C4. In FG 3, Motor A is locked, and the engine drives the first planetary gear set 24 to the second and third planetary gear sets 26, 28 and the output member 20. When operating in a FG mode of operation, the output member speed No is directly proportional to input member speed Ni and the selected gear ratio: Ni=No× GR.

With continued reference to FIG. 2, the transmission 14 is also operable to operate in four electrically variable transmission (EVT) modes. Electrically variable operating modes may be separated into four general classifications: input-split mode, output-split mode, compound-split mode, and series modes. In an input-split mode, one motor/generator is geared such that its speed varies in direct proportion to the transmission output, and another motor/generator is geared such that its speed is a linear combination of the input and output member speeds. In an output-split operating mode, one motor/generator is geared such that its speed varies in direct proportion to the transmission input member, and the other motor/generator is geared such that its speed is a linear combination of the input member and the output member speeds. A compound-split mode, on the other hand, has both motor/generators geared such that their speeds are linear combinations of the input and output member speeds, but neither is in direct proportion to either the speed of the input member or the speed of the output member. Finally, when operating in a series mode, one motor/generator is geared such that its speed varies in direct proportion to the speed of the transmission input member, and another motor/generator is geared such that its speed varies in direct proportion to the speed of the transmission output member. There is no direct mechanical power transmission path between the input and output members when operating in series mode, and therefore all power must be transmitted electrically.

In each of the four types of electrically variable operating modes indicated above, the speeds of the motors Na and Nb are linear combinations of the input and output speeds $N_i$ and $N_o$. Thus, these modes have two speed DOF. Mathematically, the speed and torque equations of these class of modes take the form:

$$\begin{bmatrix} T_a \\ T_b \end{bmatrix} = \begin{bmatrix} a_{1,1} & a_{1,2} \\ a_{2,1} & a_{2,2} \end{bmatrix} \begin{bmatrix} T_i \\ T_o \end{bmatrix}$$

and $$\begin{bmatrix} N_a \\ N_b \end{bmatrix} = \begin{bmatrix} b_{1,1} & b_{1,2} \\ b_{2,1} & b_{2,2} \end{bmatrix} \begin{bmatrix} N_i \\ N_o \end{bmatrix}$$

where a and b are coefficients determined by the transmission gearing. The type of EVT mode can be determined from the structure of the matrix of B coefficients. That is, if $b_{21}=b_{12}=0$ or $b_{11}=b_{22}=0$, the mode is a series mode. If $b_{11}=0$ or $b_{12}=0$, the mode is an input split mode. If $b_{21}=0$ or $b_{22}=0$, the mode is an output split mode. If each of $b_{11}$, $b_{12}$, $b_{21}$, and $b_{22}$ are nonzero, for example, the mode is a compound split mode.

In EVT1 and EVT4, the transmission 14 is operating in what is known as an "input-split" mode of operation, wherein the output speed No of the transmission 14 is proportional to the speed of one motor/generator. Specifically, EVT 1 Mode is achieved through the simultaneous engagement of the first and third clutches C1 and C3. When in EVT1, Motor A functions to react the engine 12 with the first planetary gear set 24, to the third planetary gear set 28, and the output member 20, while Motor B drives the second and third planetary gear sets 26, 28. Motor A propels the vehicle in EVT1. Alternatively, the transmission 14 may be selectively shifted into EVT4 Mode by actuating clutch C2 and clutch C3. In EVT4, Motor A functions to react the engine 12 with the first planetary gear set 24, to the second and third planetary gear sets 26, 28, and the output member 20, while Motor B drives the second and third planetary gear sets 26, 28. Motor B propels the vehicle in EVT4.

In EVT2 and EVT3, the transmission 14 is operating in what is known as a "compound-split" mode of operation, wherein the output speed No of the transmission 14 is not proportional to the speed of a single motor/generator, but is rather an algebraic linear combination of the speeds of both motor/generators. More particularly, EVT2 is achieved through the cooperative engagement of the first and fourth clutches C1, C4. In this maneuver, Motor A and Motor B operate to react the engine 12 with the first and second planetary gears sets 24, 26. Alternatively, the transmission 14 may be selectively shifted into EVT3 Mode by actuating clutch C2 and clutch C4. When operating in EVT3 Mode, the two motor/generator assemblies 56, 58 react the engine 12 with all three planetary gear sets 24, 26, 28.

Figure 3:
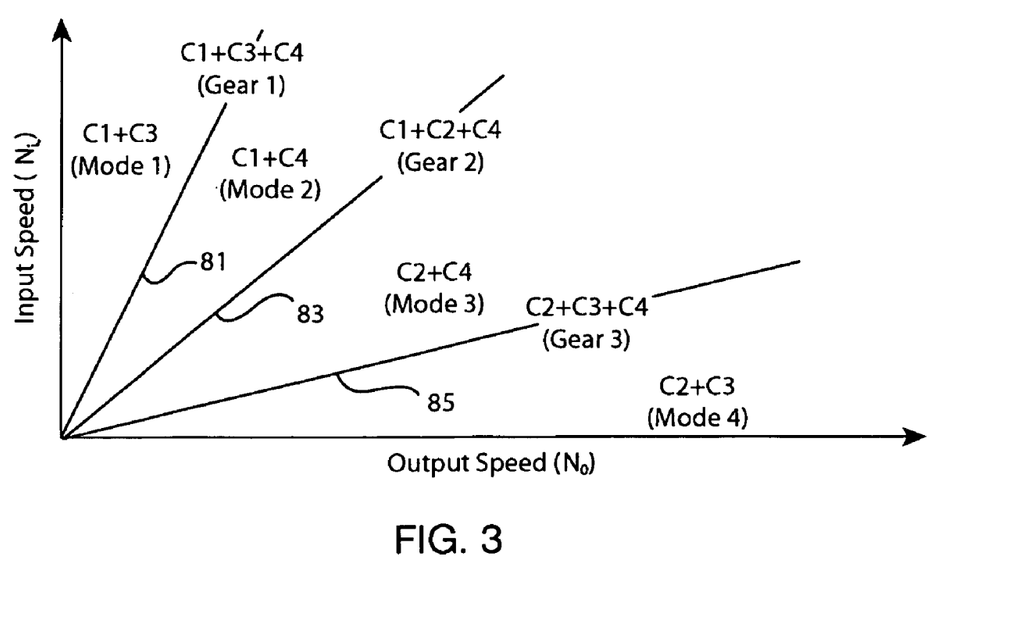
FIG. 3 is a graphical representation of various regions of operation with respect to input and output speeds of the transmission illustrated in FIG. 1.

With reference to FIG. 3, a plot of transmission output speed, No, along the horizontal X-axis versus input speed, Ni, across the vertical Y-axis is illustrated. FIG. 3 is a graphical representation of the preferred regions of operation for each operating mode with respect to input and output speeds of the transmission 14. For instance, synchronous operation in FG1, that is the input speed and output speed relationships whereat clutches C1, C3 and C4 are operating simultaneously with substantially zero slip speed thereacross, is represented by line 81. As such, line 81 represents the input and output speed relationships substantially whereat synchronous shifting from between modes can occur, or where direct mechanical coupling from input to output can be effected by simultaneous application of clutches C1, C3 and C4—i.e., fixed-ratio. Synchronous operation in FG2, that is the input speed and output speed relationships whereat clutches C1, C2 and C4 are operating simultaneously with substantially zero slip speed thereacross, is represented by line 83. Likewise, the relationships between input and output speed during operation in FG3, whereat clutches C2, C3 and C4 are operating simultaneously with substantially zero slip speed thereacross, is represented by line 85.

To the left of the shift ratio line 81 is a preferred region of operation for the first EVT mode—i.e., EVT1, identified as "Mode 1" in FIG. 3, wherein both C1 and C3 are applied, and C2 and C4 are released. To the right of the shift ratio line 81 and left of shift ratio line 83 is a preferred region of operation for the second EVT mode—i.e., EVT2, identified as "Mode 2" in FIG. 3, wherein C1 and C4 are applied, and C2 and C3 are released. To the right of shift line 83 and left of shift ratio line 85 is a preferred region of operation for the third EVT mode—i.e., EVT3, identified as "Mode 3" in FIG. 3, whereat both C2 and C4 are applied, and C1 and C3 are released. To the right of the shift ratio line 85 is a preferred region of operation for the fourth EVT mode—i.e., EVT4, identified as "Mode 4" in FIG. 3, wherein C2 and C3 are applied, and C1 and C4 are released. As used herein with respect to clutches C1-C5, the term "applied" or "actuated" indicates substantial torque transfer capacity across the respective clutch. Antithetically, the term "released" or "deactivated" indicates insubstantial or no torque transfer capacity across the respective clutch.

While the preferred regions of operation specified above are generally favored for the operation of the hybrid transmission 14, it is not meant to imply that the various EVT regions of operation depicted in FIG. 3 cannot or do not overlap. Generally, however, it is preferred to operate in the specified regions because those particular modes of operation preferably employ gear sets and motor hardware particularly well suited in various aspects (e.g., mass, size, cost, inertial capabilities, etc.) for that region. Similarly, while the individual regions of operation specified above are generally preferred for the particular modes of operation indicated, it is not meant to imply that the regions of operation for the individual EVT modes cannot be switched. A shift into Mode 1 is considered a "downshift", and is associated with a higher gear ratio in accordance with the relationship of Ni/No. In contrast, a shift from into Mode 4 is considered an "upshift", and is associated with a lower gear ratio in accordance with the relationship of Ni/No. Other Mode-to-Mode shift sequences are feasible. By way of example, a shift from EVT1 to EVT3 is also an upshift, while a shift from EVT4 to EVT2 is considered a downshift.

The general objective of upshifts and downshifts performed in accordance with the present invention is to smoothly transition from one mode to another mode with minimal torque disturbances. In the exemplary multi-mode hybrid transmission arrangement of FIG. 1, it is possible to shift from one EVT mode to another EVT mode with either the on-coming or off-going clutch, while maintaining the desired torque direction. FIGS. 4A-4B and 5A-5B each graphically depict an exemplary quasi-asynchronous gear shifting event executed by the aforementioned powertrain, driveline system, and controller architecture. The Y-axis in FIGS. 4A-5B comprises various control commands and measured variables, each plotted as a function of time on the X-axis. It should be understood that application-specific masses, inertias, friction factors, and other characteristics and parameters of the driveline affect various powertrain and driveline operating states. Therefore, the response times and magnitudes presented in FIGS. 4A, 4B, 5A and 5B are intended to be exemplary, while still descriptive of the overall operation of the powertrain system.

In overall operation, executing a quasi-asynchronous shift from an initial operating mode to a final operating mode in the exemplary transmission of the exemplary powertrain system comprises operating the transmission in an initial operating mode, and, when a shift is commanded, transitioning the transmission through an intermittent operating mode, without substantial overlap, to the final operating mode. Asynchronous shifting may be characterized in that the relative slip across the off-going and on-coming clutches is not equal to zero throughout the entire shift operation. In so doing, the transmission arrangement presented herein can transition between two operating modes with unnecessarily synchronizing an intermittent operating mode, which will become more evident from the following detailed description.

Figure 4A:
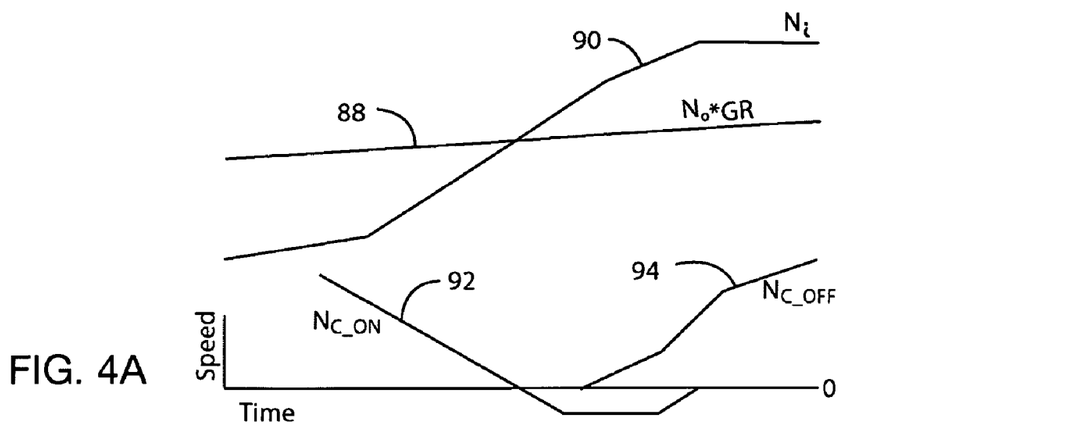
FIGS. 4A and 4B are graphical diagrams illustrating a quasi-asynchronous shift with the on-coming clutch in accordance with the present invention.

Turning first to FIG. 4A, the line depicted as 88 comprises input speed of the transmission when the powertrain is operating in a fixed gear mode. For example, if operating in FG1, wherein clutches C1, C3 and C4 are actuated, the input speed, $N_i$, is equal to output speed, $N_O$, multiplied by a first gear ratio, GR1—i.e., $N_i=N_O*GR1$. The line depicted as 90 shows input speed, $N_i$, plotted as a function of time, while the transmission 14 transitions from a first operating mode—e.g., EVT1, through FG mode operation, and into a second operating mode—e.g., EVT2, utilizing the on-coming clutch to perform a quasi-asynchronous shift scheme in accordance with one embodiment of the present invention. By way of example, the transmission may be transitioning from EVT1, with clutches C1 and C3 concurrently active, to EVT2, with clutches C1 and C4 simultaneously active, without fully synchronizing FG1 in the process, with clutches C1, C3 and C4 simultaneously active.

Figure 4B:
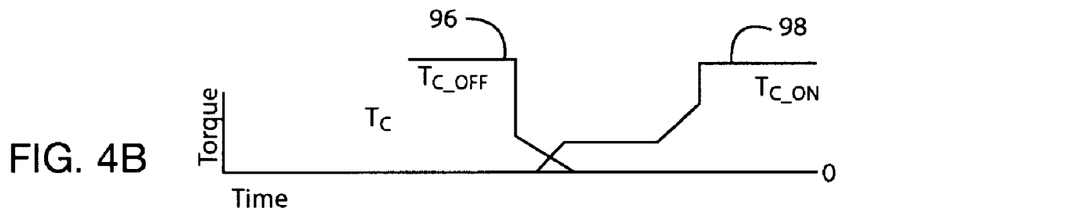

In response to a shift command from the controller architecture, e.g., ECU 80 of FIG. 1, torque capacity of the off-going clutch, in this example C3, shown as line 96 in FIG. 4B, is reduced by reducing hydraulic pressure in the clutch fill-chamber of C3. As torque capacity is reduced, it becomes equal to the magnitude of reactive torque of clutch C3. Reactive torque is commonly defined as a magnitude of torque transmitted through a torque-transfer device. Torque capacity is commonly defined as a maximum amount of torque transmissible across a clutch, and is generally based upon the magnitude of clutch pressure and clutch friction. When the magnitude of clutch torque exceeds the torque capacity, clutch "slip" occurs. The reactive torque is always less than or equal to the torque capacity. Clutch pressure is created by controlling the magnitude of hydraulic pressure applied to the clutch by the hydraulic circuit of the transmission.

In order to reduce reactive torque to the off-going clutch C3 without adversely affecting torque output of the powertrain, the TPIM controller is commanded to transfer sufficient energy to motors A and B such that their outputs or motive torques are equal to the reactive torque across the off-going clutch, and thus able to maintain the output torque at shaft 20 of the transmission 14. The torque output of motors A and B may then be concurrently increased with continued decrease in clutch torque capacity and reactive torque. When the motor output torques are sufficiently able to maintain the transmission output torque, then the reactive torque across C3 is essentially equal to zero. When the reactive torque across the off-going clutch C3 is substantially equal to zero, the hydraulic pressure actuating the C3 can be turned off with no instantaneous change in torque across the clutch pack in C3.

Actuating the on-coming clutch, in this example C4, is accomplished as follows. The rotational speeds of the on-coming and off-going clutches—e.g., C3 and C4, respectively, when in mode operation, are known and depicted as lines 92 and 94, respectively, in FIG. 4A. The change in rotational speed of the on-coming clutch C4 is also known. Using simple algebra, the control system may combine the known rotational speed of clutch C4 at any point in time, and the change in rotational speed of clutch C4, to determine an elapsed period of time necessary for rotational speeds of the reaction and friction plates of clutch C4 to be substantially equivalent. When such conditions are reached, rotational speed of the input shaft is substantially synchronized with rotational speed of clutch C4. This comprises a point at which actuation of clutch C4 can be accomplished without inducing torque disturbances in the driveline.

After the point in time whereat the input speed of the transmission and the speed of the on-coming clutch are synchronized, the torque exchange between the on-coming and off-going clutches can be performed. The torque capacity of the on-coming clutch, C4, shown as line 98 in FIG. 4B, is increased by increasing system hydraulic pressure thereto, and clutch C4 can be actuated by applying reactive torque. Torque contributions of Motors A and B are reduced as the magnitude of reactive torque of the on-coming clutch C4 increases, and the system transitions through FG mode to the target EVT operating mode, as previously discussed.

The off-going clutch C3 is subsequently deactivated, or disengaged, when the reactive torque is less than a predetermined threshold value. In the exemplary application of FIGS. 4A and 4B, the preferable predetermined value for a reactive torque at which the off-going clutch can be deactivated is a reactive torque value that is substantially zero. When the off-going clutch is deactivated, the powertrain system begins ETC mode operation, in this embodiment ETC1, with a single clutch—e.g., C1, being the lone active torque transmitting device.

The quasi-asynchronous shift described above has two distinct advantages: first, when performing the quasi-asynchronous shift, the input speed will not dwell on any of the fixed gear ratio, allowing a smoother input speed transition; second, the clutch power and energy can be very low due to the fact that the clutch slip is low when clutch pressure is applied. This innovative shift method is designed to supplement other shift types, including synchronous shifts and ETC shifts, to allow multiple paths from one EVT mode to another EVT mode without losing vehicle propulsion, and maintaining system durability.

Figure 5A:
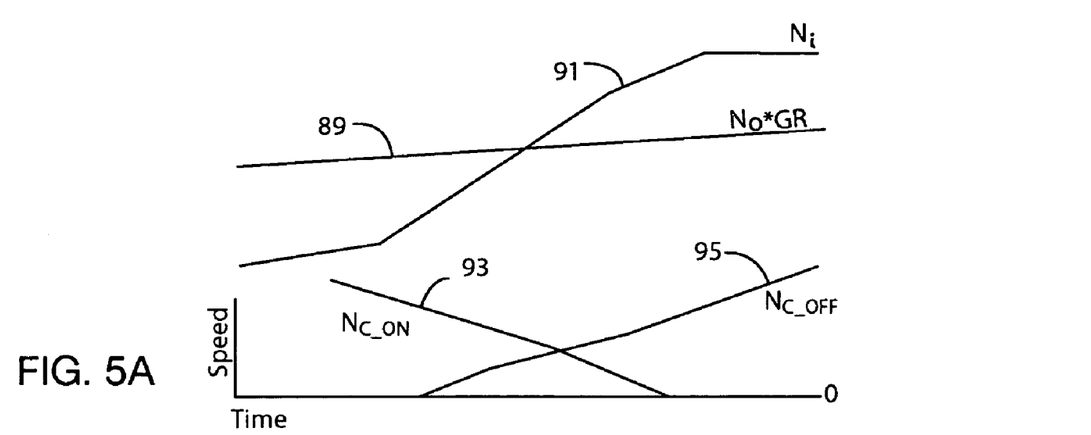
FIGS. 5A and 5B are graphical diagrams illustrating a quasi-asynchronous shift with the off-going clutch in accordance with the present invention.

With reference now to FIG. 5A, the line depicted as 89 represents input speed of the transmission when the powertrain is operating in a fixed gear mode—e.g., FG1. The line depicted as 91 shows input speed, $N_i$, plotted as a function of time, while the transmission 14 transitions from an initial first operating mode—e.g., EVT1, through FG mode operation, and into a target operating mode—e.g., EVT2, utilizing the off-going clutch to perform the quasi-asynchronous shift.

Figure 5B:
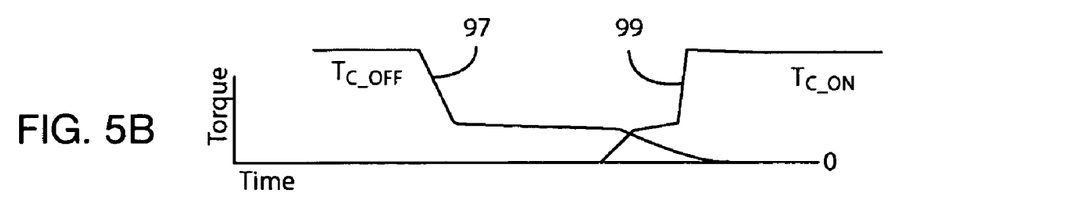

In response to a shift command from the controller architecture, torque capacity of the off-going clutch, shown as line 97 in FIG. 5B, is reduced by reducing hydraulic pressure in the clutch fill-chamber of the off-going clutch. As torque capacity is reduced, it becomes equal to the magnitude of reactive torque of clutch C3. In order to reduce reactive torque to the off-going clutch without adversely affecting torque output of the powertrain, the system controller may command the first and second motors 56, 58 to modify their respective outputs to equal the reactive torque across the off-going clutch. The torque output of motors A and B may then be concurrently increased with continued decrease in clutch torque capacity and reactive torque. When the motor output torques are sufficiently able to maintain the transmission output torque, then the reactive torque across the off-going is essentially equal to zero. When the reactive torque across the off-going clutch is substantially equal to zero, the hydraulic pressure actuating the off-going clutch can be turned off with no instantaneous change in torque across the clutch pack therein.

The rotational speeds of the on-coming and off-going clutches are known and depicted as lines 93 and 95, respectively, in FIG. 5A. The change in rotational speed of the on-coming clutch is also known. Using simple algebra, the control system may combine the known rotational speed and the change in rotational speed of the on-coming clutch to determine an elapsed period of time necessary for rotational speeds of the reaction and friction plates of the on-coming clutch to be substantially equivalent. When such conditions are reached, rotational speed of the input shaft is substantially synchronized with rotational speed of the on-coming clutch.

After the point in time whereat the input speed of the transmission and the speed of the on-coming clutch are synchronized, the torque capacity of the on-coming clutch, shown as line 99 in FIG. 5B, is increased by increasing system hydraulic pressure thereto, and can be actuated by applying reactive torque. Torque contributions of Motors A and B are reduced as the magnitude of reactive torque of the on-coming clutch increases, and the system transitions through FG mode to the target EVT operating mode, as previously discussed. The off-going clutch is subsequently deactivated, or disengaged, when the reactive torque is less than a predetermined threshold value. When the off-going clutch is deactivated, the powertrain system begins ETC mode operation with a single clutch being the lone active torque transmitting device.

Figure 6:
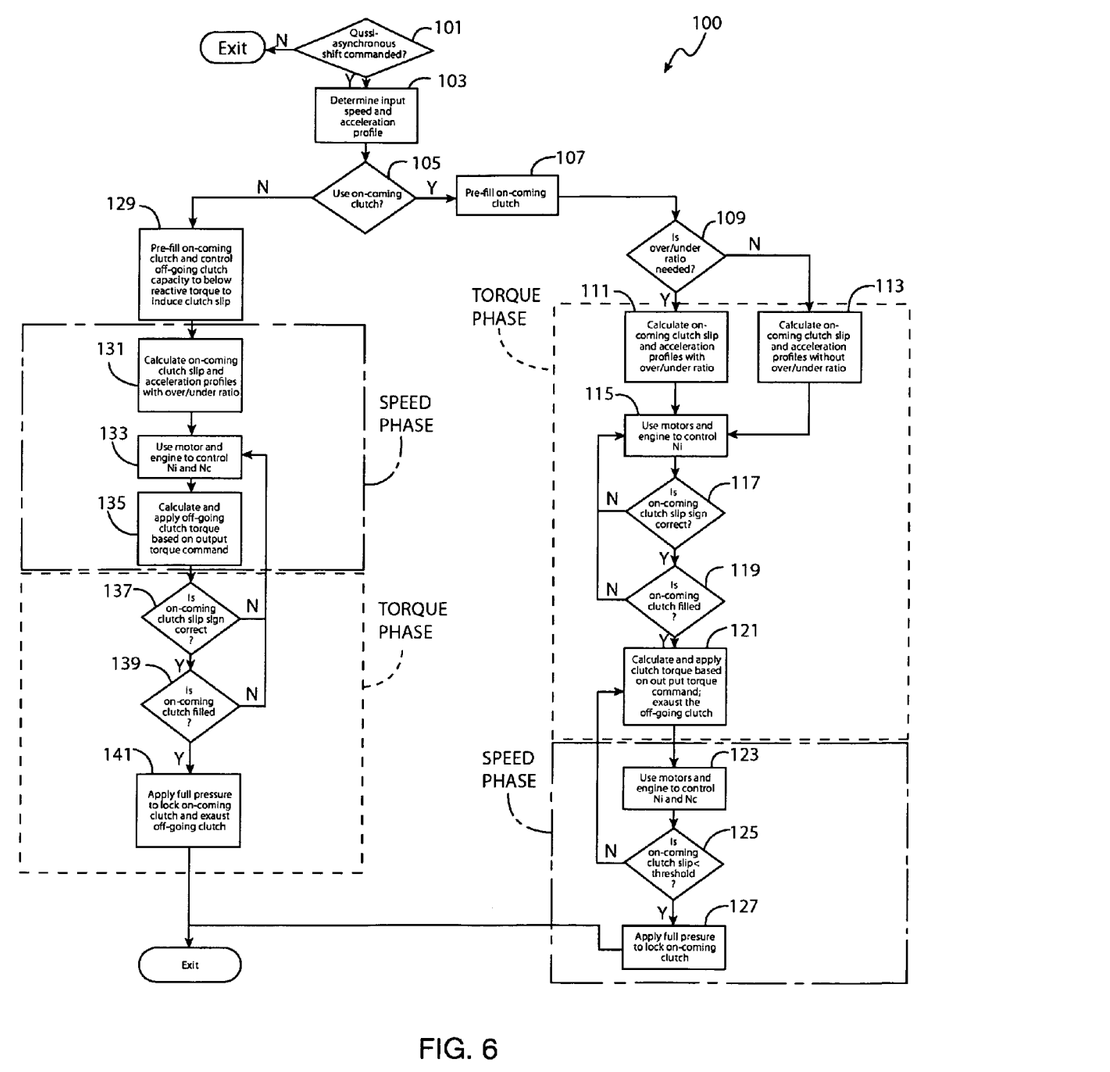
FIG. 6 is a flow chart or block diagram illustrating a shift control method in accordance with the present invention.

With reference now to the flow chart shown in FIG. 6, a control algorithm for regulating operation of a multi-mode hybrid transmission, namely an improved method for executing a quasi-asynchronous clutch-to-clutch shift operation from a first "initial" operating mode to a second "target" operating mode, is shown generally at 100 in accordance with a preferred embodiment of the present invention. The method or algorithm 100 is described herein with respect to the structure illustrated in FIG. 1, preferably executed as algorithms in the controllers of the control system described hereinabove, to control operation of the system described with reference to FIG. 1. However, the present invention may also be incorporated into other powertrain arrangements without departing from the intended scope of the claimed invention.

If a shift sequence is initiated, e.g., via driver tip-in or tip-out, the method 100 begins at step 101, wherein the system controller, such as the HCP, determines whether a quasi-asynchronous shift is optimal for completing the shift sequence under current vehicle operating conditions. If so, the HCP commands the TCM to proceed to step 103 and determine input speed and acceleration profiles. The input speed and acceleration profiles are generally based on the initial and target speeds of the on-coming clutch, as well as certain calibrations that characterize the "deflection points" of the profile. This information is used to generate an "S-shaped" speed profile such that the engine speed can smoothly takeoff from current speed, and make a "soft-landing" on the target speed.

The aforementioned S-shaped profile consists of a time-based change in speed of the on-coming clutch comprising three primary segments. The first segment has a ramp up in speed of the oncoming clutch, and ramped acceleration from zero toward a constant acceleration level. The second segment, on the other hand, has a steady state change in speed of the oncoming clutch, and thus a constant acceleration level. The third segment has ramped acceleration level from segment two toward zero, and thus a ramp down in speed of the oncoming clutch. The calibrations that characterize the "deflection points" of the profile include the overall proportion or percentages of the first and third segments. For example, segment one may comprise 15% of the entire speed phase time, whereas segment three is 20%. The second segment is then calculated as 65%. Once this is determined, the acceleration level for segment two can be calculated based on the total speed phase time and the delta speed needed to swing.

Prior to, contemporaneous with, or subsequent to steps 101 and 103, the system controller can determine if the shift operation is completed using the on-coming clutch or the off-going clutch at 105. In general, there are two ways to perform the quasi-asynchronous shift: using the on-coming clutch or the off-going clutch. Each option has certain advantages and disadvantages. Therewith, the controller will command fluid be distributed to the on-coming clutch, pre-filling the on-coming clutch to a predetermined pre-fill level, which is less than that to achieve full torque capacity, as indicated in 107.

If the shift operation is completed using the on-coming clutch, then the controller will determine, in step 109, if an "over/under ratio" is needed. An instance of over/under ratio is where the engine speed is increased/decreased to over/under the target gear ratio. In one example of "under ratio", whereat the target gear ratio is 1.00 when the output speed is 1000 rpm, the engine speed is brought from 2000 to 800 rpm on an upshift. In the same example, if the input speed is brought from 800 to 1200 rpm for the upshift, it is considered an "over ratio".

The over/under ratio is needed, for example, if the shift operation is either a power-on downshift or a power-off upshift using the on-coming clutch. In contrast, under a power-on case (i.e., positive output torque), whereat the on-coming clutch is used for completing the upshift, then no under ratio is needed. The over ratio is needed in the power-on downshift case because on-coming clutch torque will only produce positive output torque during the "under-ratioed" period. If the off-going clutch is used, then the case is just the opposite.

Once it is determined whether over/under ratio is needed, the shift operation enters into the "torque phase", and the method will then include determining on-coming clutch slip speed and acceleration profiles in steps 111 and 113. To this regard, if it is established that over/under ratio is needed, the on-coming clutch slip speed and acceleration profiles are determined based, in part, on the over/under ratio, as indicated in step 111. For instance, the on-coming clutch slip speed profile is first targeted to a slip speed equivalent of the over/under ratio speed, and thereafter retargets to zero to engage the on-coming clutch when clutch torque is to be exchanged between the on-coming and off-going clutch. However, if the over/under ratio is not needed, the shift sequence proceeds to step 113, and the on-coming clutch slip and acceleration profiles are determined without the over/under ratio. Once steps 109 through 113 are complete, the powertrain "torque-generative devices", which include the engine 12 and motor/generators 56, 58, are used, as described hereinabove, to modify the transmission input speed.

In steps 117 and 119, the system controller will determine if the on-coming clutch slip sign is correct and whether the on-coming clutch is filled. The on-coming clutch slip sign is deemed correct if the sign of the output torque command is the same as the on-coming clutch slip sign. Clutch torque and clutch slip always have the same sign (i.e., either both positive or both negative), and the transfer function between clutch torque and output torque has a fixed relationship. So, if output torque command is positive, and the transfer function has a positive coefficient, a positive clutch torque will produce positive output torque. If steps 117 or 119 return a negative signal—i.e., the on-coming clutch slip sign is incorrect or the apply chamber thereof is not filled, the system will revert back to step 115 and adjust input speed until 117 and 119 return positive signals.

If the on-coming clutch is filled, and the controller can ascertain that the slip sign is correct, the TCM will calculate and apply the off-going clutch torque based on the output torque command, and then complete the torque phase of the shift sequence by exhausting the off-going clutch in step 121. Similar to that described above with respect to step 117, the transfer function between off-going clutch torque to output torque is fixed, and, once output torque command is known, the off-going clutch torque can be determined.

With continued reference to FIG. 6, the shift operation then transitions into the speed or "inertia" phase. Performing a clutch-to-clutch shift occurs in two distinct phases: a torque phase and an inertia phase. The torque phase refers to the time duration the off-going clutch is unloaded and released. In conventional transmissions, this is done by using the on-coming clutch torque to offload the off-going clutch, and all the hydraulic controls related during the torque exchange. During the torque phase, the speed of the input shaft generally remains constant. In contrast, during the inertia phase, there is a response to the shift operation, and the input shaft changes speed. The speed phase refers to the time duration when input speed is controlled from old gear ratio toward the new gear ratio, with the use of the on-coming or off-going clutch. For instance, in an upshift, the speed may be decreased; for a down-shift, the speed may be increased.

In step 123, the powertrain torque generative devices are used to control the transmission input speed, $N_I$, and the on-coming clutch speed, $N_{C\_ON}$, for example, by adjusting torque input from the engine, the motor/generator(s), or combinations thereof. In step 125, the system will monitor, sense or otherwise determine if the on-coming clutch slip is less than a predetermined slip threshold. If the on-coming clutch slip is less than the slip threshold, the TCM will respond by locking the on-coming clutch, and exiting the sequence.

The shift operations described herein may be characterized as a quasi-asynchronous shift because the slip speed across the on-coming and off-going clutches is non-zero throughout substantially the entire shift operation. As such, if the shift is EVT-to-EVT, as explained above, the input speed will not dwell on any of the fixed gear ratios. Ideally, the slip speed across the on-coming and off-going clutches is controlled by adjusting input torque from either the engine or one of the motors.

If it is determined in step 105 that the quasi-asynchronous shift operation is to use the off-going clutch, the speed phase occurs first, and the on-coming clutch comes on during the torque phase. Accordingly, the off-going clutch must be controllably slipped prior to slipping the on-coming clutch, as indicated at 129. Specifically, the on-coming clutch is prefilled to a predetermined pre-fill level, which is less than that to achieve full torque capacity or clutch slippage. Concurrently therewith, the off-going clutch may be slipped by controlling the torque capacity of the off-going clutch to below the reactive torque.

Once the off-going clutch is slipped, the sequence will enter the speed phase. In step 131, similar to step 113 described above, the on-coming clutch slip speed and acceleration profiles are determined based, at least in part, upon the over/under ratio. Ideally, if the shift operation is completed using the off-going clutch, the transmission input speed, $N_i$, and on-coming clutch speed, $N_{C\_ON}$, are modified prior to exhausting the off-going clutch, as indicated in step 133. This is in contrast to the order presented above, whereat the transmission input speed and on-coming clutch speed are modified after exhausting the off-going clutch if the shift operation is completed using the on-coming clutch.

In accordance with the embodiment of FIG. 6, step 135 includes calculating and applying the off-going clutch torque based on the output torque command, in a manner similar to that described above with respect to step 121. In contrast to step 121, however, step 135 completes the speed phase, and therefore does not include exhausting the off-going clutch. Subsequently, the shift sequence enters into the torque phase, and in steps 137 and 139, the system controller will determine if the on-coming clutch slip sign is correct and whether the on-coming clutch is filled. If so, the controller will respond by commanding the TCM to lock the on-coming clutch and exhausting the off-going clutch in step 141 and thereafter exit the shift sequence.

The method 100 preferably includes at least steps 101-123. However, it is within the scope and spirit of the present invention to omit steps, include additional steps, and/or modify the order presented in FIG. 4. It should be further noted that the method 100 represents a single shift sequence. However, it is expected, as indicated above, that the method 100 be applied in a systematic and repetitive manner. Finally, the use of such terminology as "sensing", "detecting", "measuring", "calculating", or otherwise "determining" is not intended as limiting, and should be considered relatively interchangeable.

While the best modes for carrying out the present invention have been described in detail, those familiar with the art to which this invention pertains will recognize various alternative designs and embodiments for practicing the invention within the scope of the appended claims.

The invention claimed is:

1. A method for executing a clutch-to-clutch shift in a hybrid transmission from an initial operating mode, characterized by an off-going clutch, to a target operating mode, characterized by an on-coming clutch, the method comprising:
   commanding fluid be distributed to the on-coming clutch;
   determining if the shift is completed using the on-coming clutch;
   determining if an over/under speed ratio is needed if the shift operation is completed using the on-coming clutch;
   determining on-coming clutch slip speed and acceleration profiles;
   determining if an on-coming clutch slip sign is correct;
   determining if the on-coming clutch is filled;
   calculating an off-going clutch torque and exhausting the off-going clutch if said on-coming clutch slip sign is correct and the on-coming clutch is filled;
   determining if an on-coming clutch slip is less than a predetermined slip threshold; and
   locking the on-coming clutch if said on-coming clutch slip is less than said predetermined slip threshold.

2. The method of claim 1, wherein a slip speed across the on-coming and off-going clutches is non-zero throughout substantially the entire shift operation.

3. The method of claim 2, wherein said slip speed across the on-coming and off-going clutches is controlled by adjusting input torque from at least one of an engine and a motor each operatively connected to the transmission.

4. The method of claim 1, wherein said over/under speed ratio is needed if the shift operation is completed using the on-coming clutch and the shift operation is one of a power-on downshift or a power-off upshift.

5. The method of claim 1, wherein said on-coming clutch slip speed and acceleration profiles are determined based at least in part upon said over/under speed ratio if said over/under speed ratio is needed, and wherein said on-coming clutch slip and acceleration profiles are determined without said over/under speed ratio if said over/under speed ratio is not needed.

6. The method of claim 5, wherein said on-coming clutch slip speed profile first targets a slip speed equivalent of said over/under speed ratio and subsequently retargets to zero to engage the on-coming clutch when clutch torque is exchanged between the on-coming and off-going clutch if said over/under speed ratio is needed.

7. The method of claim 1, wherein said on-coming clutch slip sign is correct if a sign of said output torque command is the same as said on-coming clutch slip sign.

8. The method of claim 1, further comprising:
   determining transmission input speed and acceleration profiles.

9. The method of claim 8, wherein said determining said input speed and acceleration profiles is based at least in part upon profile calibrations and an initial speed and a target speed of the on-coming clutch.

10. The method of claim 9, wherein said input speed and acceleration profiles include a time-based change in speed of the on-coming clutch comprising a three-segment profile, wherein a first segment comprises a ramp up in speed of the oncoming clutch, a second segment comprises a steady state change in speed of the oncoming clutch, and a third segment comprises a ramp down in speed of the oncoming clutch.

11. The method of claim 1, further comprising:
   controlling an input speed of the transmission; and
   controlling an on-coming clutch speed;
   wherein said transmission input speed and said on-coming clutch speed are controlled via at least one of an engine and a motor each operatively connected to the transmission.

12. The method of claim 1, wherein if the shift operation is not completed using the on-coming clutch, the method further comprises:
   slipping the off-going clutch;
   determining said on-coming clutch slip speed and acceleration profiles based at least in part upon said over/under speed ratio;
   determining if said on-coming clutch slip sign is correct;

determining if the on-coming clutch is filled; and locking the on-coming clutch and exhausting the off-going clutch if said on-coming clutch slip sign is correct and the on-coming clutch is filled.

13. The method of claim 12, wherein slipping the off-going clutch includes controlling a current torque capacity of the off-going clutch to below reactive torque.

14. The method of claim 12, further comprising:

controlling an input speed of the transmission and an on-coming clutch speed prior to applying said off-going clutch torque;

wherein said transmission input speed and said on-coming clutch speed are controlled via at least one of an engine and a motor each operatively connected to the transmission.

15. The method of claim 12, wherein the off-going clutch is controllably slipped prior to slipping the on-coming clutch if the shift operation is not completed using the on-coming clutch.

16. A method for executing a shift from an initial operating mode to a target operating mode in a multi-mode, electrically variable, hybrid transmission having at least an off-going clutch and an on-coming clutch clutches and operable to receive torque from an engine and at least one motor/generator assembly, the initial operating mode characterized by the off-going clutch in an applied state simultaneous with the on-coming clutch in a released state, and the target operating mode characterized by the off-going clutch in a released state simultaneous with the on-coming clutch in an applied state, the method comprising:

filling the on-coming clutch to a predetermined pre-fill level;

determining if the shift is completed using the on-coming clutch or the off-going clutch;

slipping the off-going clutch prior to slipping the on-coming clutch if the shift operation is completed using the off-going clutch;

determining if an over/under speed ratio is needed if the shift operation is completed using the on-coming clutch;

determining on-coming clutch slip speed and acceleration profiles based upon said over/under speed ratio if the shift operation is completed using the off-going clutch or the shift operation is completed using the on-coming clutch and said over/under speed ratio is needed, said on-coming clutch slip speed and acceleration profiles being determined without said over/under speed ratio if the shift operation is completed using the on-coming clutch and said over/under speed ratio is not needed;

determining if an on-coming clutch slip sign is correct;

determining if the on-coming clutch is filled;

calculating and applying an off-going clutch torque based at least in part upon an output torque command;

locking the on-coming clutch and exhausting the off-going clutch if the shift operation is completed using the off-going clutch, said on-coming clutch slip sign is correct, and the on-coming clutch is filled;

determining if an on-coming clutch slip is less than a predetermined slip threshold and exhausting the off-going clutch if the shift operation is completed using the on-coming clutch, said on-coming clutch slip sign is correct, and the on-coming clutch is filled; and locking the on-coming clutch if the shift operation is completed using the on-coming clutch and said on-coming clutch slip is less than said predetermined slip threshold.

17. The method of claim 16, further comprising:

controlling an input speed of the transmission and an on-coming clutch speed by adjusting torque input of at least one of the engine and the motor/generator assembly;

wherein said controlling said transmission input speed and said on-coming clutch speed is performed prior to exhausting the off-going clutch if the shift operation is completed using the off-going clutch; and wherein said controlling said transmission input speed and said on-coming clutch speed is performed after exhausting the off-going clutch if the shift operation is completed using the on-coming clutch.

18. The method of claim 16, wherein a slip speed across the on-coming and off-going clutches is non-zero throughout substantially the entire shift operation.

19. The method of claim 16, further comprising:

determining transmission input speed and acceleration profiles prior to said determining if the shift operation is completed using the on-coming clutch or the off-going clutch.

* * * * *